US012452488B2

United States Patent
Kölhi et al.

(10) Patent No.: US 12,452,488 B2
(45) Date of Patent: Oct. 21, 2025

(54) METHODS AND SYSTEMS FOR GENERATING A BIOMETRIC RESPONSE PROFILE

(71) Applicant: Adeia Guides Inc., San Jose, CA (US)

(72) Inventors: Johan Kölhi, Vaxholm (SE); Anthony Friede, Upplands Väsby (SE); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 204 days.

(21) Appl. No.: 18/210,546

(22) Filed: Jun. 15, 2023

(65) Prior Publication Data

US 2024/0422387 A1   Dec. 19, 2024

(51) Int. Cl.
| | | |
|---|---|---|
| *H04N 21/442* | (2011.01) | |
| *G06F 3/01* | (2006.01) | |
| *G06V 20/40* | (2022.01) | |
| *H04N 21/44* | (2011.01) | |
| *H04N 21/45* | (2011.01) | |

(52) U.S. Cl.
CPC ....... *H04N 21/44218* (2013.01); *G06F 3/015* (2013.01); *G06V 20/44* (2022.01); *H04N 21/44016* (2013.01); *H04N 21/4532* (2013.01)

(58) Field of Classification Search
CPC ....... H04N 21/44218; H04N 21/44016; H04N 21/4532; G06V 20/44; G06F 3/015
See application file for complete search history.

(56) References Cited

U.S. PATENT DOCUMENTS

| | | | |
|---|---|---|---|
| 9,264,770 B2 | 2/2016 | Jensen et al. | |
| 9,525,912 B1 | 12/2016 | Israelian et al. | |
| 11,373,446 B1 * | 6/2022 | Beisel | G10L 25/63 |
| 2017/0095732 A1 | 4/2017 | Ghaffari et al. | |
| 2018/0376187 A1 * | 12/2018 | Everett | H04N 21/42202 |
| 2019/0200085 A1 * | 6/2019 | Merced | G16H 20/70 |
| 2020/0296458 A1 * | 9/2020 | Chappell, III | A61B 5/163 |
| 2022/0141535 A1 | 5/2022 | Merced et al. | |
| 2022/0312071 A1 * | 9/2022 | Devaraj | H04N 21/44218 |
| 2023/0038347 A1 | 2/2023 | Rajanna et al. | |
| 2023/0066410 A1 | 3/2023 | Hsieh et al. | |
| 2023/0388584 A1 * | 11/2023 | Bean | H04N 21/23418 |
| 2024/0066406 A1 | 2/2024 | Lal et al. | |
| 2024/0069625 A1 | 2/2024 | Lal et al. | |

(Continued)

OTHER PUBLICATIONS

"How to show your Heart Rate on Gaming Streams & Videos," Boosted Media, available online at <https://www.youtube.com/watch?v=joEshKuo0Y>, Sep. 5, 2019, 403 pages.

(Continued)

*Primary Examiner* — Nicholas T Corbo
(74) *Attorney, Agent, or Firm* — HALEY GUILIANO LLP

(57) ABSTRACT

Systems and methods are described for using a biometric response profile to predict a biometric response of a user to a future event. An event occurring in video content is determined. Biometric data of a user viewing the video content is received, the biometric data comprising a biometric response of the user to the event. A biometric response profile of the user indicating a predicted biometric response of the user to a future event corresponding to the event is generated based on the biometric data and the event.

20 Claims, 9 Drawing Sheets

(56) References Cited

U.S. PATENT DOCUMENTS

2024/0139462 A1 5/2024 Lal et al.
2024/0139463 A1 5/2024 Lal et al.

OTHER PUBLICATIONS

Cardia, "Heart rate monitoring client for gamers" (https://github.com/uwburn/cardia) (8 pages).

Daniel McDuff, et al., "Affectiva SDK: A Cross-Platform RealTime Multi-Face Expression Recognition Toolkit" (https://www.affectiva.com/wp-content/uploads/2017/03/McDuff_2016_Affdex.pdf), (May 7-12, 2016), (4 pages).

Fanatec.com "Realistic Simulation Hardware", (https://fanatec.com/?utm_medium=FAP+Banner&utm_source=boostedmedia&utm_campaign=General+Links&a_aid=boostedmedia), (1 page).

Instructables Circuits, "Heart Rate Monitor With PC Connectivity", (Aug. 19, 2022), (https://web.archive.org/web/20220819113319/https://www.instructables.com/Heart-rate-monitor-with-PC-connectivity/), (8 pages).

PCT Search Report PCT/US2024/033377, Sep. 30, 2024, 10 pages.

Pulsoid.net, "Heart Rate Widget for your Live streams", (Jun. 9, 2023), (https://web.archive.org/web/20230609135127/https://pulsoid.net/), (3 pages).

Simona Graur, et al., "Pupillary Motility: Bringing Neuroscience to the Psychiatry", (NIH Public Access), (Curr Neurol Neurosci Rep. Aug. 2013 ; 13(8): 365. doi:10.1007/s11910-013-0365-0.), (13 pages).

Wickramasinghe, et al. "Sensor-Based Emotion Tracking System for Computer Games" (https://ieeexplore.ieee.org/document/9671181), Jan. 1, 2022.

* cited by examiner

METHODS AND SYSTEMS FOR GENERATING A BIOMETRIC RESPONSE PROFILE

BACKGROUND

The present disclosure relates to methods and systems for generating a biometric response profile. Particularly, but not exclusively, the present disclosure relates to generating a biometric response profile for use in conjunction with an interactive digital experience.

SUMMARY

A user's experience of an interactive digital experience, such as a video game, may be limited by the user's biometric reactions to events occurring in the game, where some users may experience stronger biometric responses to events in the game than others. This may mean that a user of an interactive digital experience, such as a video game, may not experience the biometric reaction to an event in the game that was intended by the designer of the game (for example, the user may under react or overreact to an event in the game). This may result in a user not experiencing an interactive digital experience in the manner intended by the designers, resulting in a user being less engaged in the interactive digital experience.

Systems and methods are provided herein for providing a means for generating a biometric profile that may be used to cause a biometric response of a user that correlates with a desired biometric response. This may improve the responsiveness of media content to a user through adaptation and personalization of the media content based on a user's biometrics. For example, a biometric response profile of a user may be generated based on the user's reaction to, e.g., events occurring in video content, where those events may be used to generate future events (e.g., in other media content), in order to elicit a desired biometric response of the user. For example, by determining an event occurring in video content, and receiving biometric data of a user viewing the video content, the biometric response of the user to the event may be determined. It may therefore be determined whether a future event which corresponds to the event would cause a similar reaction of the user, and therefore whether the future event would cause a desired response in the user. A biometric response profile of the user may be generated which indicates a predicted biometric response of a user to a future event, whereby the biometric response profile may be used to predict a biometric response of a user to the future event. For example, the biometric response profile may be used to determine the future event, or a future event from among a plurality of future events, which may be used in order to cause a desired biometric response of the user.

According to the systems and methods described herein, an event occurring in video content is determined. For example, the video content may be a TV show, a film, an online video, a live stream, or any content viewed by a user. (In some examples, media content, such as a video game, extended reality (XR) content, audio content, such as music, and so on, is processed in place of the video content). An event may be anything occurring in the video content. For example, an event may be a change which occurs in the video content, such as an abrupt incident. An event may be an incident occurring in the video content, and may be an audio incident, such as a change in volume, a particular sound occurring, such as a door slamming, or shouting, particular music being played, and so on, and/or may be a visual incident, such as a sudden or abrupt change in an image, an appearance of, the presence of, or a change in configuration of an object, such as a person, an animal, an arthropod, an appearance of, the presence of, or a change in configuration of an inanimate object, a change in lighting, and so on, or an action performed or involving an object. An event may comprise any of a sound, an image, a series of images (e.g., a video clip), particular lighting, haptic feedback, or any combination thereof. The event may be a sudden change occurring in the video content, or may be a gradual change occurring in the video content, for example, music which builds suspense. The event may be an incident that invokes a biometric reaction of the user. The determined event may be a representation of the event, such as description of the event, an image corresponding to the event, metadata relating to the event, and so on. Improved responsiveness of an interactive digital experience to a user may be achieved through real-time adaptation and personalization of the interactive digital experience based on a user's biometrics.

Biometric data of a user viewing the video content may be received, the biometric data comprising a biometric response of the user to the event. For example, while the user is watching the video content, biometric data of the user corresponding to the time at which the user experiences the event may be received. The biometric data may indicate the reaction of the user to the event. For example, the biometric data may comprise any of a heartrate, respiratory rate, blood oxygen level, changes in eye tracking, pupillometry, electroencephalogram (EEG) data, galvanic skin response, or any other appropriate biometric data. Where the biometric data changes from a user's baseline biometric data, it may be determined that the user has a biometric response (e.g., an emotional response) to the event. The biometric data may be generated by a sensor, such as a biometric sensor.

Based on the biometric data and the event, a biometric response profile of the user may be generated indicating a predicted biometric response of the user to a future event corresponding to the event. For example, the biometric response profile may comprise an indication of at least one event, along with the user's reaction to that at least one event. In some examples, the user may have a biometric response to an event (e.g., the user's biometrics may vary from the user's baseline biometrics). In other examples, the user may not have a biometric response to the event (e.g., the user's biometrics may not vary from the user's baseline biometrics). The biometric response profile may therefore comprise a plurality of events, and the biometric response or reaction that each of the plurality of events causes for a user (which may be no reaction). In some examples, the biometric reaction of the user to an event may be an increase in excitement level (e.g., an increase in stress, fear, adrenaline, and so on), or may be a reduction in excitement level (e.g., a reduction in stress, fear, adrenaline, and so on). The biometric response profile may therefore indicate, for a future event corresponding to the event (e.g., the future event being similar to, or based on, the event) to which the user is exposed, the likely biometric response of a user. In an example, the biometric response profile further indicates a likely reaction of a user to the same or similar event same event presented to the user within a particular time frame. For example, where a user is exposed to the same event in quick succession, their reaction to the event the second time may be lessened compared to their reaction the first time. Thus, the biometric response profile may indicate a minimum time period between the exposure of the user to the same or a similar event required for the user to have the same biometric response (e.g., rather than a diminished response) to the future event.

The biometric response profile may be used to predict a biometric response of a user to the future event. For example, where the user has reacted to a particular event, it may be assumed that the user will react to a future event which is similar to, or based on, the event in a similar manner (e.g., the user will have the same biometric response if exposed to a future event which is similar to the event on which the biometric response profile is based). The biometric response profile may comprise a plurality of events, each indicating the likely biometric response of the user to a future event similar to a particular event.

In some examples, a biometric target may be received. For example, while a user is interacting with an interactive digital experience (such as a video game, or extended reality/XR), a biometric target may be provided which indicates how the developer intends the user to react at a certain time point during the interactive digital experience. Biometric data of a user while the user is interacting with an interactive digital experience may be received. For example, the biometric response of a user may be monitored (e.g., continuously or periodically), while the user is interacting with the interactive digital experience. The biometric response of the user may be monitored by any appropriate sensor. It may be determined that the future event is to be used in content of the interactive digital experience based on the current biometric data of the user, the biometric target, and the biometric response profile by determining that the future event is predicted to cause an increase or reduction in biometric response of the user to achieve the biometric target. For example, an event may be chosen from amongst a plurality of events indicated by the biometric response profile as being an event to which the user will experience a biometric response which most closely matches the increase or decrease in biometric response from the user's current state required to achieve the biometric target. Thus, it may be determined that a future event corresponding to the chosen event will likely cause a reaction of the user which (approximately) matches (or exceeds) the biometric target. It may be determined whether a future event is to be used based on the time that has elapsed since the user has been exposed to the same or a similar event as the future event. For example, the biometric response profile may further comprise information on the reaction of the user to an event when subsequently exposed to the same event, where the user may have a lessened reaction to a future event if they have been exposed to the same or a similar event within a particular time frame. Therefore, a future event may not be used if the time elapsed between a preceding similar or same event as the future event is insufficient. In some examples, adapted content of the interactive digital experience comprising the future event may be generated. For example, the biometric response profile may comprise a description of the event, such as "door slamming". Adapted content of the interactive digital experience may then be generated to incorporate a future event, for example, so that the user may experience the event in the style of the interactive digital experience (e.g., the user may not be aware that the gameplay has been altered, as the adapted content may be consistent with the graphics, sound etc. of the interactive digital experience). The adapted content may be incorporated into current content of the interactive digital experience. For example, the adapted content may be incorporated into the interactive digital experience at a point where the biometric target indicates that the user should have a biometric response corresponding to the event (e.g., a door may slam at a point where the biometric target indicates that a user's heart rate should accelerate).

In some examples, the biometric target may be set based on a control configuration (e.g., a parental control configuration), wherein the control configuration indicates a maximum biometric response of a user. For example, parental control configuration may indicate an upper limit on biometric response of a user (e.g., a child). This may mean a future event for use in an interactive digital experience may only be selected if it is predicted that the biometric response of the user to the future event will be below a threshold (e.g., below the maximum biometric response).

In some examples, content biometric data of the user during interaction of the user with the content of the interactive digital experience is received. For example, the biometric response of a user may be (continuously or periodically) monitored while the user interacts with the digital experience, in order to gauge the user's reactions to the content of the interactive digital experience, and to determine a current biometric level of the user. For example, where the current biometric level of the user is already high, an event to be included may cause less of a biometric reaction in order to reach the biometric target than where the current biometric level of the user is low. In some examples, an alert is generated if a content biometric response of the user determined using the content biometric data of the user exceeds the biometric target. The alert may be generated if the content of the interactive digital experience comprising adapted content causes the biometric response of the user to exceed the biometric target (e.g., if the future event incorporated into the content of the interactive digital experience has caused too much of a biometric response).

In some examples, further biometric data of a user is received during interaction of the user with the content of the interactive digital experience comprising a biometric response of the user to a further event in the content. The biometric response profile of the user may be updated based on the biometric response of the user to the further event in the content. The further event may be a future event incorporated into the content of the interactive digital experience. The reaction of a user to a future event may be used to update the biometric response profile, for example, to confirm that the reaction of the user to a future event was as expected, or that the user has reacted different than expected to the future event. The further event equally may be a new event, where the new event and the biometric response of a user to the new event may be incorporated into the biometric response profile. The biometric response profile may also be updated to incorporate further events along with the biometric response, such as events occurring in the interactive digital experience.

In some examples, a plurality of users is grouped based on a biometric response profile generated for each user, wherein users having similar predicted biometric responses to the future event are grouped in the same group. For example, multiplayer interactive digital experiences may provide the same or similar content, such as the same "world" for a group of users, for example, a group of users playing against one another, or players on the same team. The interactive digital experience may be adapted as described above in order to incorporate future events, where it may be desirable for users to have a similar reaction to such future events. Therefore, by grouping users with a similar biometric response profile (e.g., to play within the same "world" having the same future events incorporated), it may be ensured that users experience the game similarly, and some users do not have an unfair advantage over others. In an example, the users may be grouped prior to a group session, where users are grouped to have similar biometric responses. In another example, the users may be grouped prior to a group session where users have a range of biometric response profiles, but where each group has players corresponding to players of another group with corresponding biometric responses, e.g., each group has the same variety of players with similar biometric response profiles. In a further example, the users may be grouped based on their biometric reaction to events occurring in an interactive digital experience during a group session. For example, at the end of a group session, users may be re-grouped into groups of users having similar biometric reactions to a previous group session.

In some examples, a suggestion of media content is output to a user device based on the biometric response profile of the user. For example, the biometric response profile may determine events occurring in media content, such as a film, TV series, video game, and so on, and suggest to a user device media content that comprises events which cause a biometric response of the user.

In some examples, a suggestion of media content is output to a user device based on current biometric data of the user, the biometric response profile of the user, and a target biometric response. For example, a target biometric response may indicate the desired biometric response of a user. The desired biometric response may be to elevate the (stress or excitement levels) a biometric response of a user (e.g., where a user wishes to be stimulated), or may be to lower the biometric response of a user (e.g., where a user wishes to have their excitement levels lowered).

In some examples, the future event comprising media (e.g., audio and/or visual) output corresponding to the event is generated to achieve a biometric target based on the biometric response profile of the user and current biometric data of the user. For example, the future event may be generated for incorporation in an interactive digital experience, for use in media content, such as TV or film, may be generated as sound, for example, through a speaker such as headphones, and so on.

In some examples, a predicted response of the user to further video content is determined based on the biometric response profile. For example, further video content may be assessed to determine if the further video content comprises events corresponding to events indicated by the biometric response profile of the user as causing the user to react in a particular manner. For example, it may be determined that the user has strong reactions to particular types of events, where further video content may be assessed to determine the likely reaction of the user to further video content (e.g., based on the type of events comprised in the further video content). Further video content may be suggested to the user where it is determined that the user is likely to react favorably to further video content based on the biometric response profile. For example, it may be determined whether a user will enjoy particular advertising content, or a particular video or film.

According to the systems and methods described herein, media content is used to generate a biometric response profile of a user, based on the reaction of a user to events occurring in the media content.

According to the systems and methods described herein, a biometric response profile of a user indicating a likely reaction of the user to an event is used in conjunction with a user set threshold to determine events to incorporate into media content, such that the threshold is not exceeded.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
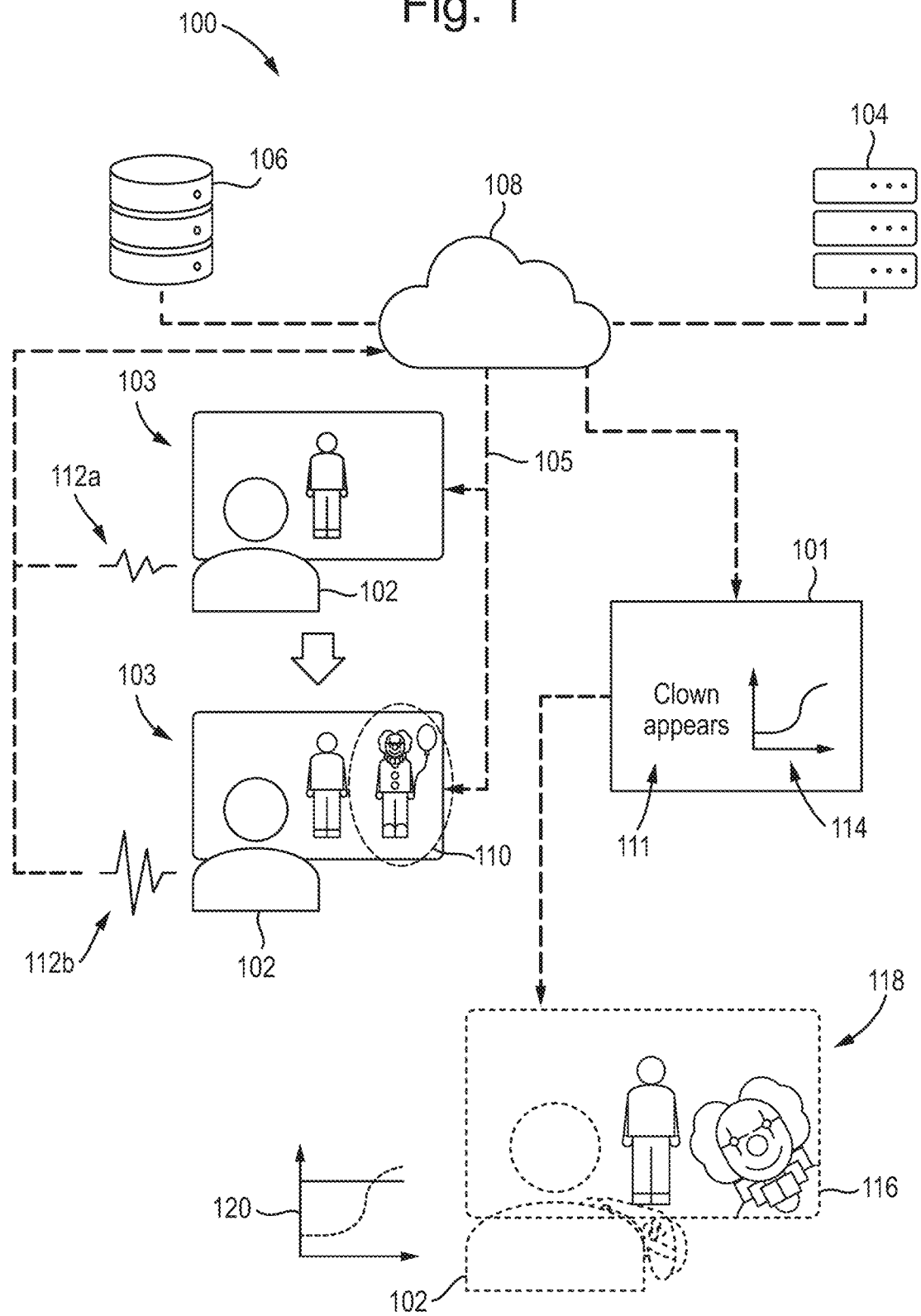
FIG. 1 illustrates an overview of the system for generating a biometric response profile of a user, in accordance with some examples of the disclosure.

FIG. 1 illustrates an overview of a system 100 for generating a biometric response profile 101 of a user 102. In particular, the example shown in FIG. 1 illustrates a user device 103, such as a television, communicatively coupled to a server 104 and a content item database 106, e.g., via network 108. The user device 103 shown here is a television, but it will be appreciated that the user device may be any device capable of receiving and displaying video content, such as a computer, a laptop, a tablet, a smartphone, a smartwatch, and so on. The user device 103 of this example receives video content 105 from the server 104 (e.g., in this example, the server 104 provides the video content to the user device, although in other examples, it will be appreciated that the video content may be supplied by a further server, via the internet, or any other telecommunications network, to the user device). In some examples, the server 104 receives the video content from a further server, and/or from a further network, where the video content may be provided to the user device 103 from the further server, and/or from the further network, via the server 104, or directly from the further server (e.g., via the further network). The video content 105 may in some examples be received at the server 104 from the user device 103, for example, where the video content is received at the user device 103 from another server, and the user device 103 forwards the video content to the server 104. For example, the video content may be received at the user device 103 from a first server, where a second server may be used to perform the methods described herein (e.g., alone or in combination with the first server). In any case, the server 104 may receive or comprise the video content 105. The user device 103 is configured to output, or display, the video content 105. Thus, in this example, the user device 103 provides the user 102 with access to video content, e.g., provided by a content provider operating server 104.

The video content 105 is processed at the server 104 to determine an event 110 occurring in the video content 105. The event 110 occurring in the video content may be determined using any appropriate process, such as computer vision, image processing, a machine learning process, a trained model, and so on. In this example, the event 110 which occurs is that a clown has appeared on the screen of the user device. The server further receives biometric data 112 of the user viewing the video content. In particular, a sensor (not shown) is configured to detect the biometric responses of a user while they are viewing the video content. For example, the sensor may be any of or a combination of a pulse meter, a respiration rate detector, blood oxygen level monitor, an eye tracking sensor, such as a camera, an electroencephalogram (EEG) machine, galvanic skin response sensor, wearable sensor (e.g., smart watch that can measure heart rate and other biometric data), and so on. The biometric data of the user preceding the event 112*a*, and the biometric data of the user during the event 112*b*, are received at the server 104. Using the difference in the biometric data of the user preceding the event 112*a* and during the event 112*b*, the biometric response 114 of the user may be determined (e.g., the change in biometric data may be determined) by the server 104.

By determining the biometric response 114 of the user, and the event 110 (e.g., generating an indication 111 of the event 110, such as a description of the event 110, e.g., "a clown appears"), a biometric response profile 101 of the user may be generated. The biometric response profile 101 may indicate a predicted biometric response 114 of the user to a future event 116 corresponding to the event 110. For example, the biometric response profile 101 may indicate the likely response of a user to an event which is similar to, or based on, the event 110. In this example, the future event comprises a clown appearing in media content consumed by the user.

The biometric response profile 101 may then be used to predict a biometric response of a user to the future event 116. For example, a future event 116 may be incorporated into gameplay 118 during a video game, such as a clown appearing suddenly on screen. It will be appreciated that event (e.g., the clown) that is generated as a future event may not be the same, or represented in the same way, as the event on which the future event is based (e.g., the clown of the video content), and may be an adaptation, inspired by, or more broadly based on a general description (e.g., indication 111) of the event 110. To determine whether to incorporate such a future event, the biometric response profile 101 may be used to determine if a desired reaction 120 of the user is likely to be achieved by incorporating the future event. If it is determined that a future event may cause a desired reaction, the future event may be incorporated into media content (e.g., gameplay).

Figure 2:
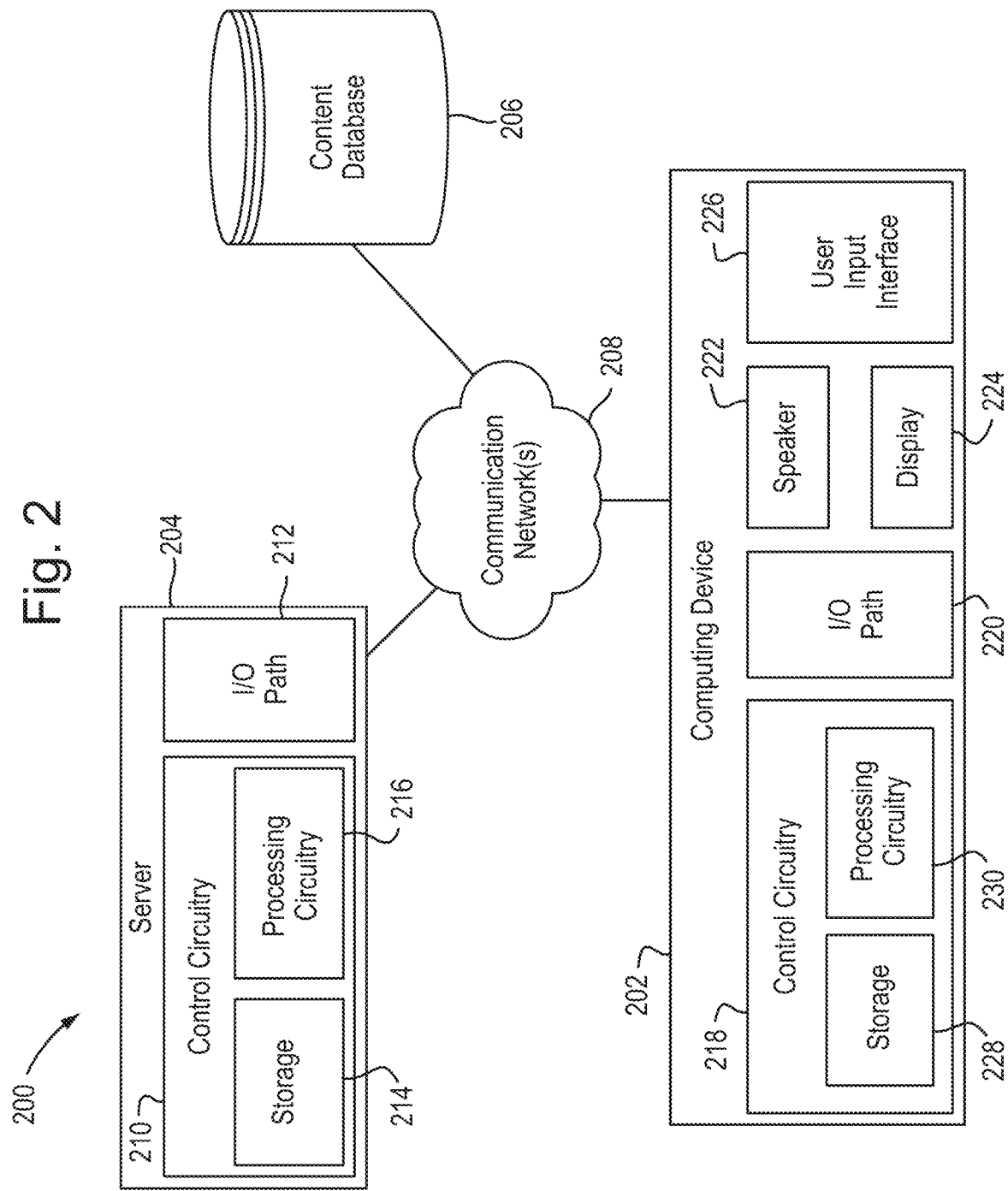
FIG. 2 is a block diagram showing components of an example system for generating a biometric response profile of a user, in accordance with some examples of the disclosure.

FIG. 2 is an illustrative block diagram showing example system 200, e.g., a non-transitory computer-readable medium, configured to generate a biometric response profile 101 of a user 102. Although FIG. 2 shows system 200 as including a number and configuration of individual components, in some examples, any number of the components of system 200 may be combined and/or integrated as one device, e.g., as user device 103. System 200 includes computing device n-202 (denoting any appropriate number of computing devices, such as user device 103), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor). Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to initiate video content playback, to control circuitry 210 and/or 218 using user input interface 226.

User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
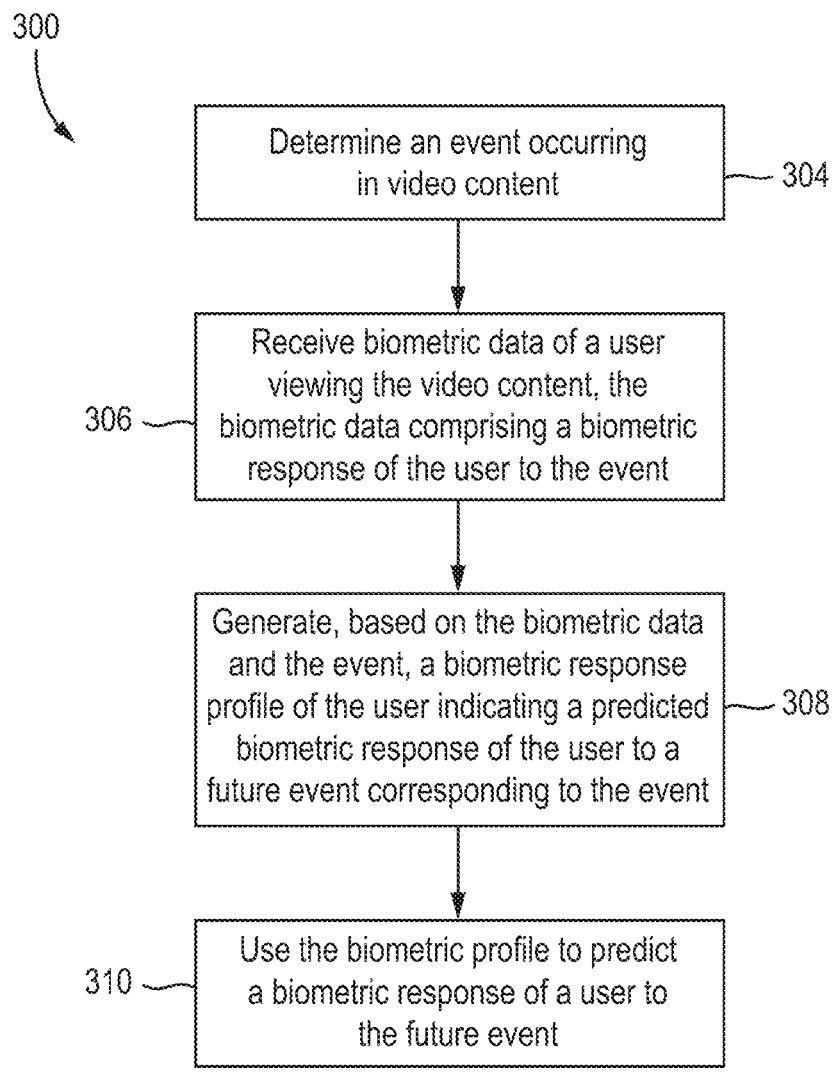
FIG. 3 is a flowchart representing a process for generating a biometric response profile of a user, in accordance with some examples of the disclosure.

FIG. 3 shows a flowchart representing an illustrative process 300 for generating the biometric response profile 101, such as the biometric response profile 101 shown in FIG. 1. While the example shown in FIG. 3 refers to the use of system 100, as shown in FIG. 1, it will be appreciated that the illustrative process 300 shown in FIG. 3 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user device 103, control circuitry of the server 104, or control circuitry of a further device, working either alone or in some combination.

At 304, control circuitry, e.g., control circuitry of the server 104, an additional server, or the user device, determines an event 110 occurring in video content (e.g., the server 104 may be the server providing the video content to the user device 103, or an additional server may provide the video content to the user device 103 and/or to the server 104). Control circuitry of the server 104 and/or the user device 103 may receive video content 105. The video content 105 may comprise a video, TV content, a film, a live stream, a video stream, a video game, and so on, or any part thereof. The video content 105 may be received from the server 104, from a further server, or any other broadcasting device, from the user device 103, or from any further device. The video content 105 may also be received at the user device 103, such that the user 102 may view the video content 105 on the user device 103. In further examples, media content may be received and processed using the methods herein in place of the video content.

The video content may be processed, using any appropriate means such as a computer vision process, an image processing process, a machine learning model, an artificial intelligence, audio processing, a large language model (LLM model), object recognition processes, and so on, which is capable of extracting information from media content such as video content, for example, to determine happenings of the video content. For example, the video content 105 may be analyzed to determine incidents occurring in the video content, such as a particular sounds (e.g., eerie sounds, music, sound effects, volume of the sound, soundtracks, and so on), particular objects which are seen in the video content, such as person, an animal, an arthropod, an inanimate object, an action performed by an object, a configuration or change in configuration of an object, lighting levels (e.g., sudden darkness, or continual darkness), colors, and so on, in order to extract an event 110 occurring in the video content. The event 110 may be extracted by generating metadata associated with the event 110, a description of the event 110, such as a text description, an image, or any other appropriate indication of the event 110.

At 306, control circuitry, e.g., control circuitry of the server 104, receives biometric data 112 of a user 102 viewing the video content, the biometric data 112 comprising a biometric response 112 of the user 102 to the event 110. The biometric data 112 of the user 102 may be received from any device that is able to measure biometric fluctuations of a user 102. In an example, a sensor is used to monitor the biometrics of a user 102. For example, the sensor may comprise a pulse meter, a respiration rate detector, blood oxygen level monitor, an eye tracking sensor, such as a camera, an electroencephalogram (EEG) machine, galvanic skin response sensor, an audio sensor, an accelerometer, or any combination thereof. The biometric sensors may be sensors such as sensors measuring heart rate (pulse), skin moisture, eye tracking, pupil dilation, EEG brain waves, movement, location, accelerometer measurements, audio (microphone), blood oxygen level, temperature, touch, and so on. Any of the metrics determined by these sensors may be used as an indication of the emotional arousal (e.g., excitement, stress levels) of a user 102. For example, pulse meters measure heart rate of the user 102 (e.g., how fast the heart beats), which may be used as a direct indicator of the excitement or stress levels of a user 102. Respiratory rate is also an indicator of excitement or stress levels. Blood oxygen level may also be used as an indicator of a user 102's excitement or stress levels. For example, low blood oxygen level may be an indicator of respiratory irregularities. If a person experiences intense fear, irregular breathing can occur and both respiratory rate and blood oxygen level may indicate this. Eye tracking cameras may be used to infer changes in eye tracking and pupil dilation, which may be used to detect excitement or fear. Pupillometry used alongside an EEG may indicate whether an increased pupil dilation of a user 102 is due to cognitive load, or other factors, such as attraction or fear. Similarly, EEG may be used to calculate frontal asymmetry which may indicate whether or not the user 102 is inclined to approach or avoid a stimulus. In general, heart rate, respiration rate, galvanic skin response, electrical activity of the brain, and pupil diameter can be measured and used as an indicator of a user's emotions. A sensor (or a plurality of sensors) may be comprised in any suitable device, such as a running watch, a smart watch, a smart ring, an XR (extended reality) device, an EEG band, a camera, and so on. Any number of sensors and/or devices may be used in order to collect biometric data 112 of the user 102. Thus, sensors may be used to track a user's excitement level or biometric responses. Biometric data of the user may be collected (and/or transmitted to the server) periodically or continuously.

In an example, the event may be determined to occur based on a biometric response of a user (e.g., a change in a user's biometric response, such as a sudden change). For example, a user having a biometric response (e.g., an increase in heart rate) to video content may trigger the video content to be analyzed (e.g., by the server 104) in order to determine an event which has occurred in the video content that has caused the biometric response of the user (e.g., a preceding predetermined amount of the video content may be analyzed, for example, the last 20 seconds, and/or a subsequent predetermined amount of video content may be analyzed, for example, the next 20 seconds).

At 308, control circuitry, e.g., control circuitry of the server 104, generates, based on the biometric data 112 and the event 110, a biometric response profile 101 of the user 102 indicating a predicted biometric response of the user 102 to a future event 116 corresponding to the event 110. For example, the biometric response profile 101 may provide a correlation between the biometric response of the user 102 and a particular future event. The future event may be an event which may be incorporated, for example, into the video content, into other video content, media content, gameplay, such as for a video game, an augmented reality experience, and so on. The future event may be incorporated into media content, for example, using the style of the media content, such as similar graphics and sound, in order that adapted content comprising the future event does not appear to the user to be an addition to the content of the media content, and instead appears as a seamless part of the content of the media content. In a further example, where the future event is, or comprises, a sound, modifications such as filtering, direction of output of sounds (e.g., 3D surround), attenuation, and so on, may be used in order to generate adapted content comprising the future event which correlate to the media content in which it is to be incorporated.

It will be appreciated that different events may cause different biometric reactions for different users. By determining the reaction of a user 102 to an event in video content, the biometric response profile 101 of the user 102 may be personalized to indicate particular events which cause a reaction of the user. For example, some users may have a fear of heights, where they may react strongly to a future event involving heights, whereas another user 102 who is unaffected by heights may have a fear of spiders, and therefore instead react strongly to a future event involving a spider. The biometric response profile 101 may therefore indicate for a particular user 102 which event should be used to generate a particular biometric response in that user 102. The biometric response profile 101 may further indicate events to which the user 102 has no reaction, or a very minor reaction, so that the biometric response profile 101 indicates a plurality of events with the user's reaction to each event (e.g., a strong reaction, no reaction).

In an example, the biometric response profile of a user may be augmented by incorporating additional information about the user and their response to events. For example, a series of tests may be created in order to measure the user's reaction to different events to determine the biometric responses of a user corresponding to different levels of excitement, such as calm, neutral, and excited. In a further example, questions may be presented to the user, such as requesting the user to indicate any particular phobias (e.g., spiders, heights, snakes, and so on), which may then be registered in the biometric response profile of the user as events which will cause a high biometric response of the user.

The biometric response profile of the user may be generated by first recording a baseline of a user's reaction to various events, for example, by recording the user's biometric reactions to various events, and determine the typical biometric responses for different excitement levels, such as intense excitement, neutral, calm, and so on. For example, a plurality of events which are typically experienced by users as "scary" may be shown to the user while their biometric responses are measured. Then, events which may cause no, or a neutral reaction, may be shown to users while their biometric responses are measured, and then a plurality of events which typically lower biometric responses of a user may be shown to the user while their biometric responses are measured. In this way, when a future event is correlated with a predicted biometric response of the user, the type of biometric response may be further indicated, e.g., whether the biometric response of the user is one in which the user is calm, neutral, or excited. As the biometric response profile is developed with the inclusion of additional events, the determination as to the type of biometric response elicited by the user may be refined, for example, by comparison of previous biometric responses of the user to the new biometric responses.

Figure 4:
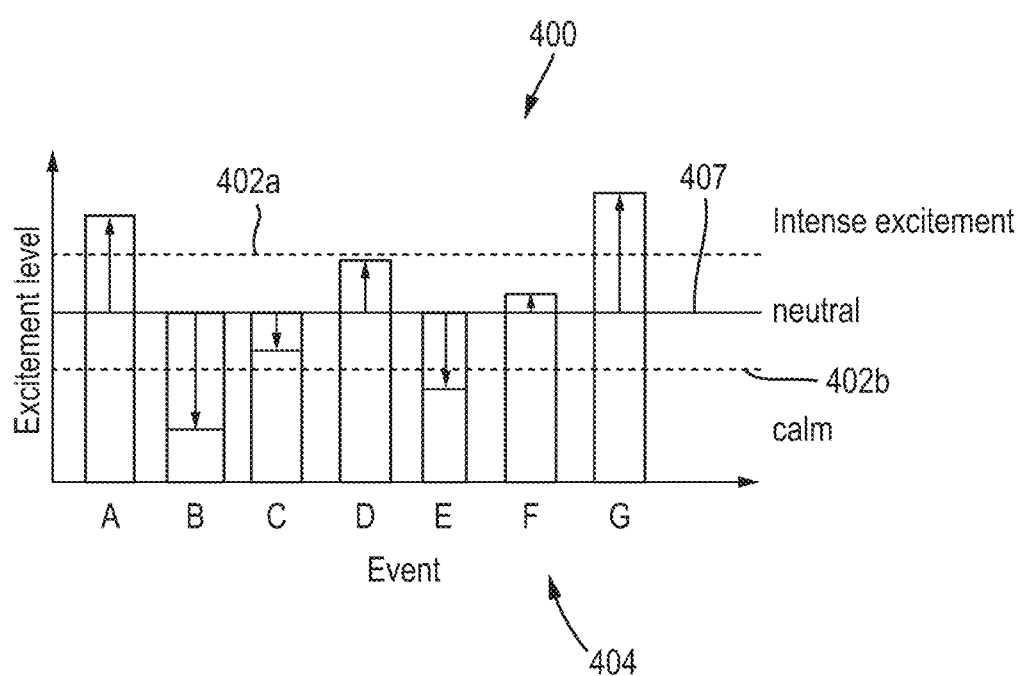
FIG. 4 illustrates an example of a biometric response profile of a user, in accordance with some examples of the disclosure.

FIG. 4 illustrates an example of a biometric response profile 400 of a user according to an example, In particular, FIG. 4 illustrates a biometric response profile 400 of a user comprising two thresholds 402—an upper threshold 402*a* and a lower threshold 402b of biometric response. In this example, the biometric response is described as "excitement". As is illustrated in this Figure, a biometric response indicating a level of excitement exceeding the upper threshold 402a is labelled "intense excitement". A biometric response indicating a level of excitement between the upper threshold 402a and the lower threshold 402b is labelled "neutral". A biometric response indicating a level of excitement below the lower threshold 402b is labelled "calm". In this example, the biometric response profile has been generated for a plurality of events 404 labelled A-G. As is illustrated here, the user has had a different biometric response to each of these events. For example, events A, D, F and G produced an increase in excitement of the user from a baseline level 407 (e.g., neutral), where events D and F caused a small increase in excitement, and these events did not cause the biometric response of the user to exceed the upper threshold 402a, whereas events A and G caused a stronger biometric response of the user above the upper threshold 402a from the baseline level 407. Events B, C, and E all caused a reduction in excitement of the user from a baseline level 407. Event C caused a small decrease in excitement, where this event did not lower the user's excitement level below the lower threshold 402b. Events B and E lowered the user's excitement levels further than event C, and both caused the excitement levels of the user to be reduced below the lower threshold 402b.

At 310, control circuitry, e.g., control circuitry of the server 104, uses the biometric response profile to predict a biometric response of a user to the future event 116. For example, it may be predicted whether a future event 116 presented to a user is likely to cause a reduction or an increase in biometric response of the user.

In an example, the biometric response profile of the user may be used to incorporate events into media content for the user, in order that the user is better engaged with the media content. For example, events which cause a target biometric responses of the user may be incorporated into media content. In a further example, events occurring during the media content may be exchanged for future events corresponding, for example, to phobias of the user, in order to elicit a stronger reaction of the user, or events corresponding to phobias which will occur in the media content may be exchanged for events which do not elicit such a strong reaction in the user, or the event may be altered (for example, where the phobia is a spider, the spider may be made to move slower).

In an example, the media content is an interactive digital experience, such as a video game or an extended reality (XR) experience (such as virtual reality (VR), augmented reality (AR), mixed reality (MR) and so on).

In an example, while a user interacts with an interactive digital experience, the user's biometric response to the interactive digital experience may be monitored (for example, any, or any combination of, heart rate, breathing rate, pupil dilation, skin conductivity, aiming/movement stability, and so on, may be monitored). The user's current biometric data may be compared with a biometric target (e.g., target range, or span) a set by the interactive digital experience. Based on the instantaneous and timeweighted deviations of the user's biometric state from the biometric target, future events may be incorporated into the content of the interactive digital experience, to influence the user's biometric response to correspond as closely as possible to the target biometric response. The user may authorize their biometric data or response to be shared, for example, with servers or platforms, such as a cloud gaming service. The biometric data or response may be exchanged, for example, using API calls.

For example, a biometric target may be received at a biometric engine of an interactive digital experience. The biometric target may be set by the interactive digital experience. For example, the biometric target may be predetermined, and may define a designer of the interactive digital experience's ideal biometric experience of a user to the interactive digital experience at a particular part of the interactive digital experience.

The biometric target may define an intended biometric response in different parts (scenes, locations, video sequences or similar) of the interactive digital experience. To generate the biometric target (e.g. prior to execution of the method currently described), a biometric timeline may be created by running tests with any of beta testers, pilot testers and test groups, and end-users, to determine likely reactions of users to particular events occurring in the digital experience. This biometric timeline may comprise minimum and/or maximum values for all the biometric and haptic sensors while a user is interacting with the interactive digital experience.

Current biometric data of a user while the user is interacting with an interactive digital experience may be received. For example, the user may be (continuously) monitored while interacting with the interactive digital experience in order to determine the user's real-time biometric responses to the interactive digital experience.

A future event to be used in content of the interactive digital experience may then be determined based on the current biometric data of the user, the biometric target, and the biometric response profile. A difference between the user's current biometric response and a target biometric response may be determined. Based on the difference between the biometric target indicating the user's ideal response range to the interactive digital experience, and the user's biometric response, a future event may be selected using the biometric response profile of the user, for example, a future event which is predicted to cause a reaction of the user which will which will alter the current biometric response of the user so that the target biometric response is achieved. The target biometric response may be higher or lower than the user's current biometric response, and therefore, the event selected may be intended to either reduce the user's excitement/stress levels, or increase the user's excitement/stress levels.

As is described above, the biometric response profile of the user may comprise an indication of a predicted biometric response of the user to a future event corresponding to the event, which may also include events to which the user has no, or a very minor, biometric response. In some examples, the biometric response profile may be used to determine that a future event in the content of the interactive digital experience is intended to elicit a particular reaction from the user. However, where the biometric response profile indicates that the user's likely reaction to the future event will not achieve a biometric target, the content of the interactive digital experience may be altered, so that a different future event is incorporated (in particular, one that is predicted to cause a biometric reaction of the user which will achieve the biometric target). In some examples, by analyzing the biometric response profile of a user and comparing it with the intended effect of the upcoming content, the likely reaction of a user to upcoming content may be determined. For example, it may be determined, based on the current biometric response of the user, and the biometric response profile of the user, how the user is likely to react to upcoming content of the interactive digital experience. Where it is determined that the user is unlikely to have a biometric reaction that will achieve the biometric target, a future event may be determined to be incorporated into content of the interactive digital experience (either by incorporation or by exchanging with another event) by determining that the future event is predicted to cause an increase or reduction in biometric response of the user as required to achieve the biometric target.

Once a future event has been determined, adapted content of the interactive digital experience comprising the future event may be generated. For example, the future event may be an indication of a type of event that causes the user to react in a certain way. This indication may be used to generate a future event corresponding to the type of event that causes the user to react in the desired way. Adapted content comprising a future event may be generated based on the concept of the event corresponding to the future event. Following the example shown in FIG. 1, the user may be particularly responsive to clowns (e.g., the user may experience a stress response when they see an image of a clown). Where the predicted biometric reaction of a user to "a clown" would likely cause the biometric response of the user to be increased and achieve the target response, a future event may be generated based on the concept of "a clown". A clown generated to be incorporated into the adapted content may not be the same clown as occurred in the video content. In particular, the concept of "a clown" may be used to generate an image of a clown, for example, using the style of the interactive digital experience, such as similar graphics, in order that the adapted content does not appear to the user to be an addition to the content of the digital experience, and instead appears as a seamless part of the content of the interactive digital experience.

The adapted content may be incorporated into current content of the interactive digital experience. For example, the biometric target may indicate a point, or time, in the interactive digital experience, at which the user should experience a particular biometric response. The adapted content comprising the future event which is predicted to cause the desired biometric response may be incorporated into current content of the interactive digital experience at the time indicated by the biometric target.

By directly interacting with each person's unique combinations of instantaneous and time-weighted physiological responses and reactions as determined by their biometric responses to events occurring in the interactive digital experience, users may be able to experience the interactive digital experience more closely to the way the designer of the interactive digital experience intended (for example, to experience the content/environment to be just as scary, suspenseful, overwhelming and/or thrilling as the original designers intended). Furthermore, the methods and systems herein may be applied to existing interactive digital experiences, such as video games, to incorporate new events, so that a game with which a user may be overly familiar may be refreshed by the incorporation of new events.

In an example, the interactive digital experience may be designed to have a plurality of alternative scenes or locations that may be selected based on the user's biometric response profile, e.g., by selecting particular scenes or locations which comprise events which will cause a desired response of the user. The interactive digital experience may additionally alter the audio (volume, direction, selected soundtrack, sound effects), colors (darker, more vivid colors, black and white, and so on), blurriness, and/or lighting, based on the biometric response profile of the user to make a scene less or more scary/exciting for the user (e.g., based on the user's reaction to similar events, such as a blurred screen, a change in lighting, particular audio, and so on). Different parts of a level may have different levels of biometric target.

Figure 5:
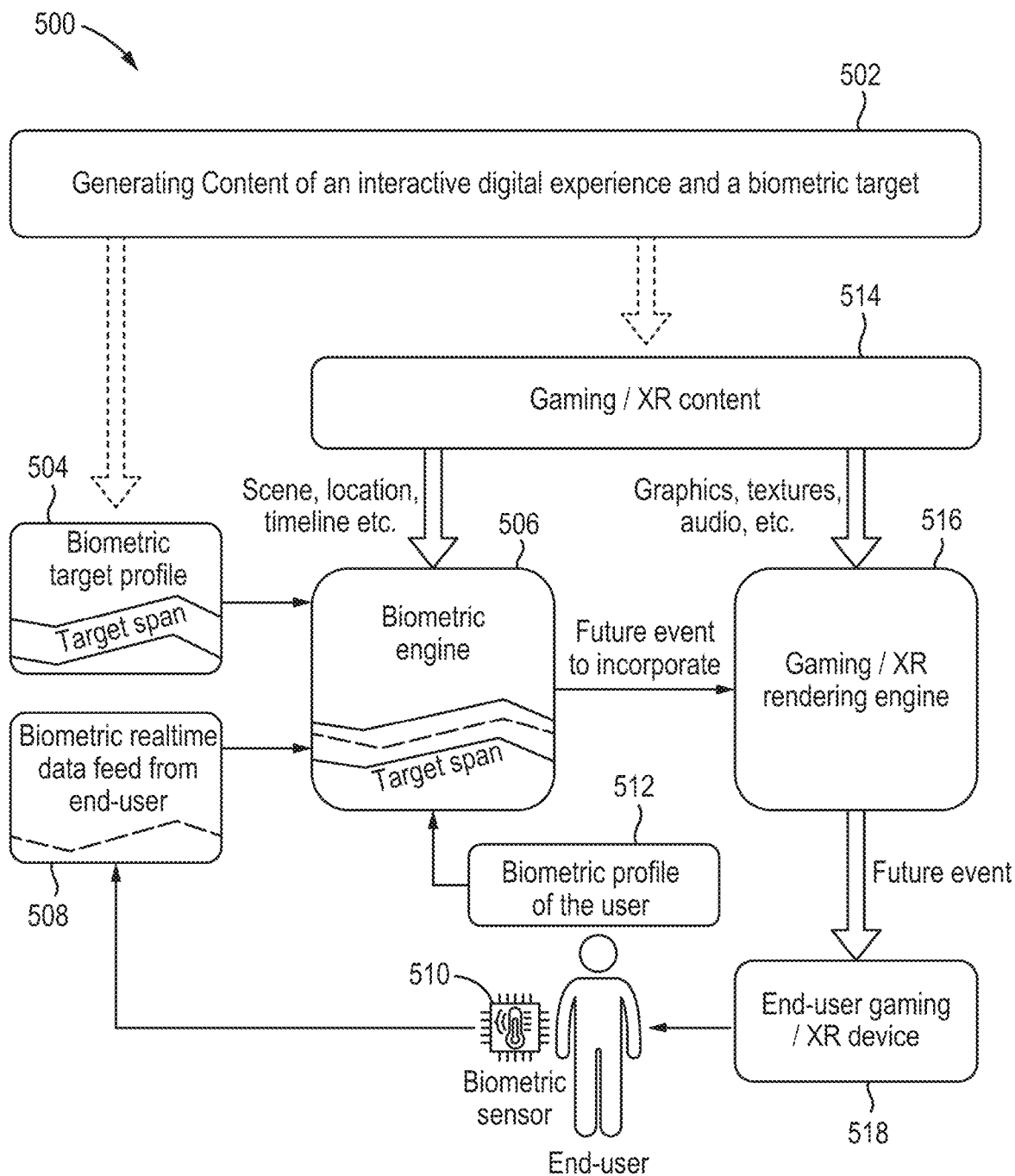
FIG. 5 illustrates an example of using a biometric response profile of a user, in accordance with some examples of the disclosure.

FIG. 5 illustrates an example of an overview of a process 500 for incorporating adapted content into current content of an interactive digital experience. In particular, FIG. 5 illustrates that a step of content generation 502, for example, by a developer of the interactive digital experience. As is further illustrated in this Figure, a biometric target 504 generated at 502 is used as input to a biometric engine 506, along with current biometric data of the user 508, detected using a sensor 510. The biometric engine also receives the biometric response profile of the user 512. The content of the interactive digital experience 514 is also used as input to the biometric engine, for example, so that as the interactive digital experience is experienced by the user, biometric engine may determine what the current target biometric response is for current gameplay. Then, the biometric engine 506 may process the biometric target 504 and the received current biometric data of the user 508, in order to determine whether the user's excitement levels should be raised or reduced. As is shown in this Figure, the biometric target 504 may indicate an upper and lower threshold for the excitement levels of the user. The user's excitement levels may therefore be raised or lowered, or be kept the same, to maintain, or cause, the user's current biometrics to be within the range. Once it has been determined whether the user's excitement levels should be raised or lowered, and by how much, the biometric response profile of the user 512 may be used to determine a future event which is predicted to raise or lower the user's excitement levels by the amount determined. Adapted content comprising the future event may be generated (e.g., rendered) by an interactive digital experience engine 516 using any of the graphics, audio, textures, and so on defined by the interactive digital experience content 514. For example, adapted content comprising the future event may be generated. The adapted content comprising the future event may then be output to a user device 518, for example, a gaming or XR device, and may be incorporated into current content of the interactive digital experience.

In some examples, a plurality of users is grouped based on a biometric response profile generated for each user, wherein users having similar predicted biometric responses to the future event are grouped in the same group. For example, multiplayer interactive digital experiences may provide the same or similar content, such as the same "world" for a group of users, for example, a group of users playing against one another, or players on the same team. The interactive digital experience may be adapted as described above in order to incorporate future events, where it may be desirable for users to have a similar reaction to such future events. Therefore, by grouping users with a similar biometric response profile (e.g., to play within the same "world" having the same future events incorporated), it may be ensured that users experience the game similarly, and some users do not have an unfair advantage over others. In an example, the users may be grouped prior to a group session, where users are grouped to have similar biometric responses. In another example, the users may be grouped prior to a group session where users have a range of biometric response profiles, but where each group has players corresponding to players of another group with corresponding biometric responses, e.g., each group has the same variety of players with similar biometric response profiles. In a further example, the users may be grouped based on their biometric reaction to events occurring in an interactive digital experience during a group session. For example, at the end of a group session, users may be re-grouped into groups of users having similar biometric reactions to a previous group session.

In a further example, the biometric response profile may be continuously updated based on the user's biometric responses during interaction of the user with the interactive digital experience. For example, further biometric data of a user during interaction of the user with the content of the interactive digital experience may be received. The further biometric data may comprise a biometric response of the user to a further event in the content, and wherein the biometric response profile of the user is updated based on the biometric response of the user to the further event in the content. It will be further appreciated that the user's response to an event may change over time. For example, where a user is exposed to the same event a plurality of times, their reaction that that event may be lessened. The updating of the biometric response profile may reflect a user's more recent reactions to an event, rather than the reaction of a user to an event when it was first registered with the biometric response profile. In a further example, the biometric response profile may rotate between different events having similar biometric responses of the user for use in media content, in order that the user is not over-exposed to a particular event or events.

Figure 6:
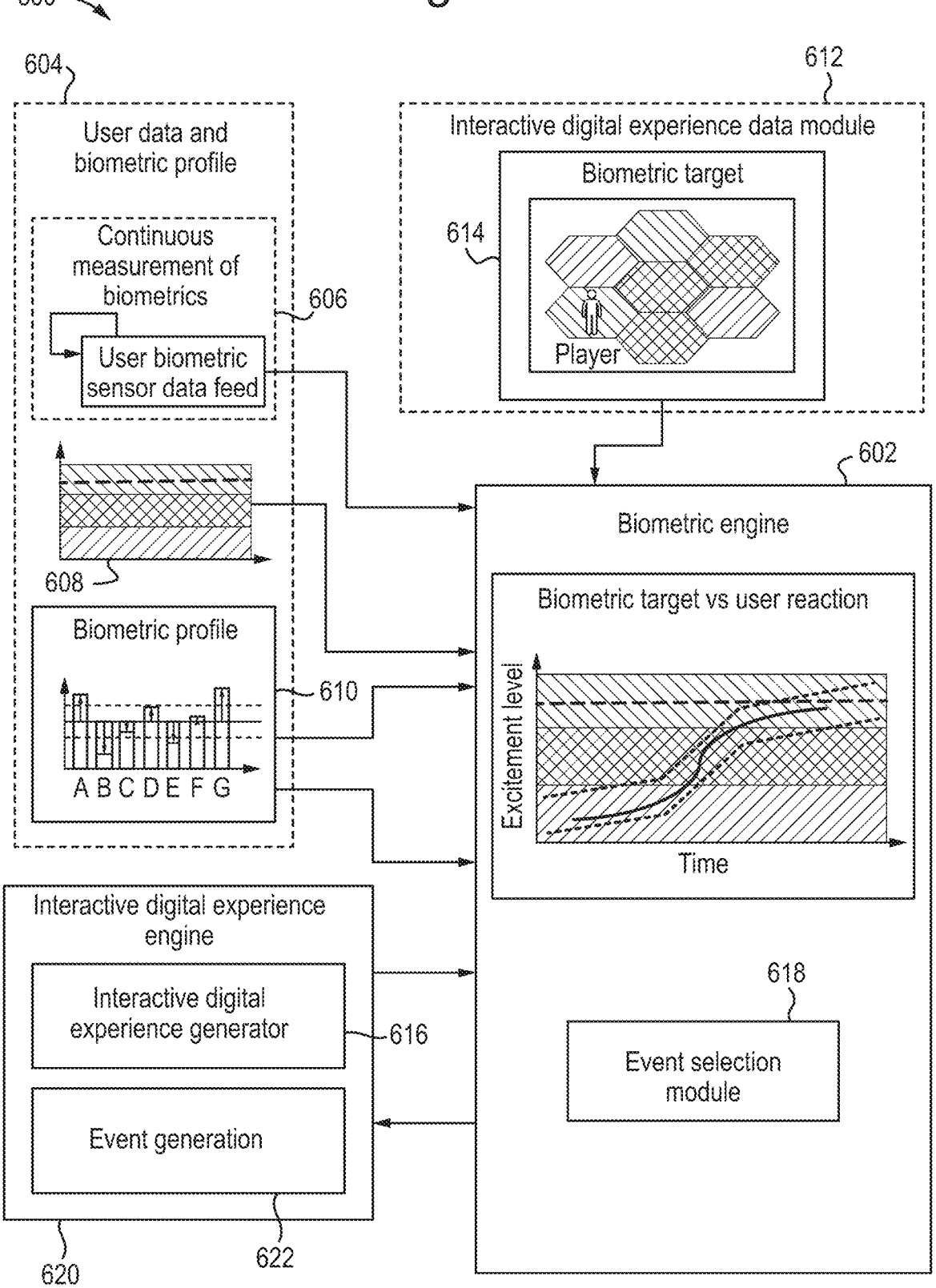
FIG. 6 is a block diagram showing components of an example system for using a biometric response profile of a user, in accordance with some examples of the disclosure.

FIG. 6 illustrates an example of system 600 for generating adapted content of an interactive digital experience comprising a future event. In particular, FIG. 6 illustrates a biometric engine 602 which may be used to determine a future event to be used in content of the interactive digital experience. The biometric engine 602 may receive from a user information module 604, current biometric data of the user 606 (e.g. while the user is interacting with an interactive digital experience), which may be continuously measured by a sensor. The biometric engine 602 may also receive, from the user information module 604, a biometric threshold 608, for example, a user set biometric threshold indicating a maximum biometric response of the user. The biometric engine 602 may also receive, from the user information module 604, a biometric response profile 610 of the user. The biometric engine 602 may receive, from an interactive digital experience data module 612, data from the developer of the interactive digital experience, such as a biometric target 614 (e.g., a biometric target which is tied to, for example, any of coordinates, levels, story paths, maps, and so on). The biometric engine 602 may receive, from an interactive digital experience engine 620, information on the current point in the interactive digital experience (e.g., a current coordinate, levels, story paths, map, and so on) based on current output from an interactive digital experience generator 616. The biometric engine 602 may determine, based on the received biometric target 614, the received biometric threshold 608, the current point in the interactive digital experience, and the current biometric data of the user 606, a difference between the current biometrics of the user and the biometric target 606. The biometric engine 602 may then select, using an event selection module 618, a future event which is predicted to cause a biometric response of the user which corresponds to the biometric target 614, but that will not exceed the user's biometric threshold 608. Once the future event has been selected, it is sent to the interactive digital experience engine 620, where an event generation module 622 generates adapted content of the interactive digital experience comprising the future event. The adapted content is then incorporated into the interactive digital experience by the interactive digital experience generator 616.

Figure 7:
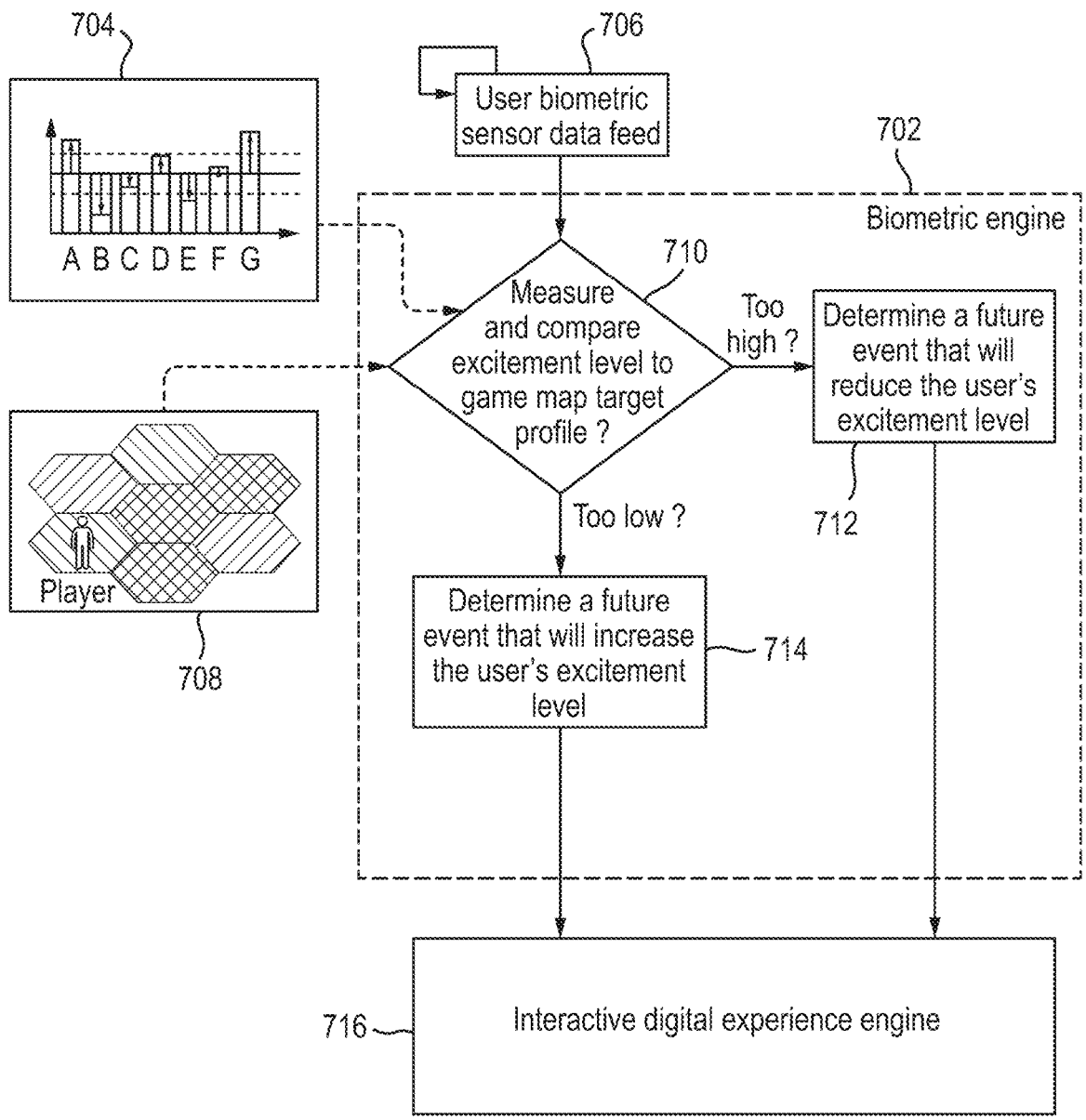
FIG. 7 is a block diagram illustrating a process performed to use the biometric response profile of a user, in accordance with some examples of the disclosure.

FIG. 7 illustrates a flow diagram showing an example of the decision processes which may be performed by a biometric engine 702 (e.g., the biometric engine 602 of FIG. 6) for the generation of content of an interactive digital experience. In particular, the biometric engine 702 receives the biometric response profile 704 of the user, current biometric data of the user, 706, and a biometric target 708 (e.g., a target set by the developers of the interactive digital experience). The biometric engine 702 then determines the difference between the current biometric data of the user and the biometric target for the point in the interactive digital experience that the user is currently experiencing 710. Where it is determined that the biometric response of the user is too high (e.g., the excitement of the user is higher than the biometric target), a future event is determined based on the biometric response profile of the user which will lower the user's biometric response (e.g., excitement level) 712. Where it is determined that the biometric response of the user is too low (e.g., the excitement of the user is lower than the biometric target), a future event is determined based on the biometric response profile of the user which will increase the user's biometric response (e.g., excitement level) 714. Then, the determined event is output to an interactive digital experience engine 716, where the interactive digital experience engine 716 generates and incorporates content into the interactive digital experience comprising the determined future event.

In a further example, a biometric target may be (at least partially) set based on a user, or on user preferences. For example, the biometric target may be altered based on user input, for example, where a user may increase a maximum excitement level, or may reduce the maximum excitement level, depending on whether they wish to be stimulated or relaxed. The biometric target may be a target set by the by the developer or the media content, where the user may then additionally indicate a maximum and/or minimum desired biometric response (e.g., the biometric target may additionally comprise at least one biometric threshold).

The biometric target may be based on the maturity of a user (e.g., the age of a user), where the biometric target may indicate, in addition to a desired target biometric response of a user, a maximum biometric response of a user, and/or particular types of events to be included or excluded based on the maturity of the user. For example, for a child, the biometric target may indicate a maximum level of excitement as well as ensuring that only age-appropriate events are incorporated into the interactive digital experience. Thus, a mature user may experience the interactive digital experience in a different way to a less mature user. This may be a seamless setting, adjusting a game to be a little more or a little less mature.

In an example, the biometric target may be set based on a control configuration (e.g., a parental control configuration), wherein the control configuration indicates a maximum biometric response of a user. For example, the biometric target may be determined based on input received from a parent or guardian. The received input may indicate a maximum biometric response that should be achieved, for example, by the inclusion of events. The parental control configuration may define a parental threshold which may be implemented in the control loop for the excitement level in the biometric engine to allow younger gamers to play potentially scary games. By setting a maximum level of excitement, the biometric engine may ensure that events which are to occur in the interactive digital experience which may cause too great a biometric response of the user (e.g., based on the biometric response profile on that user) are exchanged for events determined by the biometric response profile of the user to cause a lower biometric response of the user.

Figure 8:
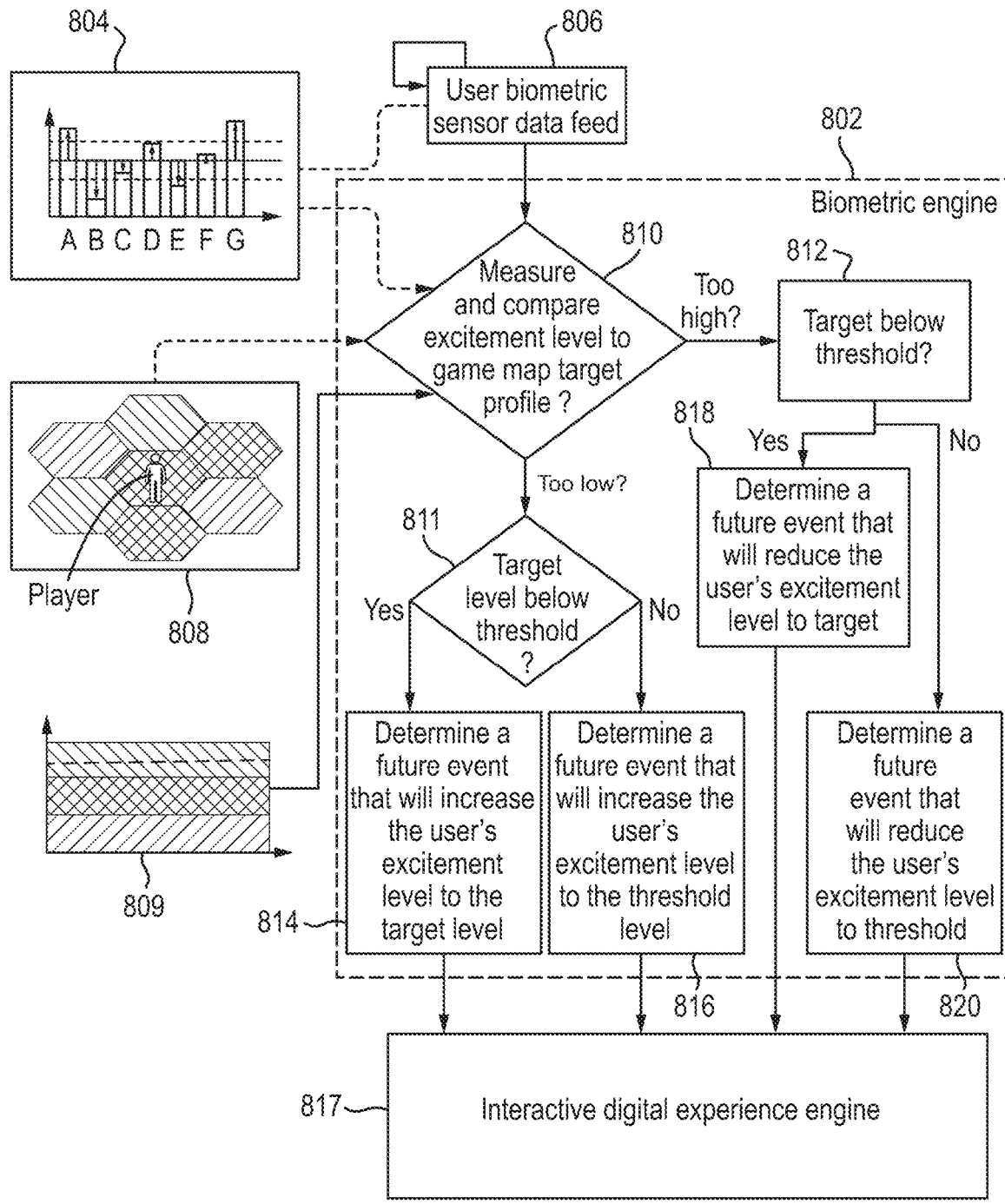
FIG. 8 is a block diagram illustrating a process performed to use the biometric response profile of a user, in accordance with some examples of the disclosure.

FIG. 8 illustrates a flow diagram showing an example of the decision processes similar to that of FIG. 7, where in this example, a threshold biometric response is also provided. In particular, FIG. 8 illustrates an example of the processes which may be performed by a biometric engine 702 (e.g., the biometric engine 602 of FIG. 6) for the generation of content of an interactive digital experience. In particular, the biometric engine 802 receives the biometric response profile 804 of the user, current biometric data of the user 806, and a biometric target 808 (e.g., a target set by the developers of the interactive digital experience). The biometric engine 802 further receives a biometric threshold 809, indicating a maximum biometric response (e.g., level of excitement) of the user. The biometric engine 802 then determines the difference between the current biometric data of the user and the biometric target for the point in the interactive digital experience that the user is currently experiencing 810. Where it is determined that the biometric response of the user is too high (e.g., the excitement of the user is higher than the biometric target), a future event is determined based on the biometric response profile of the user which will lower the user's biometric response (e.g., excitement level) 812. Where it is determined that the biometric response of the user is too low (e.g., the excitement of the user is lower than the biometric target), it is then determined if the biometric target 808 is lower than, or below, than the biometric threshold 809, 811. If the biometric target 808 is lower than the biometric threshold 809, a future event is determined based on the biometric response profile of the user which will increase the user's excitement level to the biometric target 814. If the target biometric response 808 is higher than the biometric threshold 809, a future event is determined based on the biometric response profile of the user which will increase the user's excitement level to the biometric threshold 816. Where it is determined that the biometric response of the user is too high (e.g., the excitement of the user exceeds the biometric target), it is determined at 812 whether the biometric target 808 is below the biometric threshold 812. If the biometric target 808 is lower than the biometric threshold 809, a future event is determined based on the biometric response profile 804 of the user which will reduce the user's excitement level to the biometric target 808, 818. If the biometric target 808 is higher than the biometric threshold 809, a future event is determined based on the biometric response profile 804 of the user which will reduce the user's excitement level to the biometric threshold 809, 818. Then, the determined event is output to an interactive digital experience engine 817, where the interactive digital experience engine 817 generates and incorporates content into the interactive digital experience comprising the determined future event.

In some examples, an alert may be generated if the biometric response of a user (e.g., a child) exceeds a threshold (for example, the alert may be generated at a user device, such as a smartphone, of a parent or guardian of the child). For example, content biometric data of the user may be received during interaction of the user with the content of the interactive digital experience, and an alert may be generated if a content biometric response of the user determined using the content biometric data of the user exceeds the biometric target comprising a threshold. In this way, a parent or guardian may be notified if a child has experienced too intense a reaction to content of the interactive digital experience. Where the biometric target is set based on a parental control configuration, such a notification may indicate to the parent or guardian that the child's reaction to the interactive digital experience has exceeded the maximum response which they set.

In an example, a suggestion of media content may be output to the user based on the biometric response profile of the user. For example, media content such as an interactive digital experience may be recommended to the user based on the biometric response profile of the user (e.g., a game which comprises events that will cause a strong biometric response of the user may be recommended to the user, as this may indicate that the user will be engaged with the game). In other examples, the media content may be a TV series, video stream, music, video, or film. For example, a film or TV series which comprises events determined to cause a strong biometric reaction in the user may be suggested.

In a further example, a suggestion of media content may be output to the user based on current biometric data of the user, the biometric response profile of the user, and a target biometric response. In an example, the target biometric response may be based on the time of day, where in the evening it may be desirable to lower the biometric response of the user so media content (e.g., a video or a game) may be suggested which comprises events which are predicted to lower the user's biometric response. Conversely, in the morning, it may be desirable to increase the biometric response of the user (e.g., to "wake up" the user) so media content may be suggested which comprises events which are predicted to increase the user's biometric response. In other examples, the target biometric response may be set by the user. For example, the user may indicate that they would like to relax, and the media content may be suggested which is predicted to lower the user's biometric response.

In an example, the biometric response profile of the user may be used to generate a future event comprising audio or visual output to achieve a biometric target based on the biometric response profile of the user and current biometric data of the user. For example, in the context of an interactive digital experience, as is described above, the biometric response profile of a user may be used to generate output of a future event which corresponds to an event, by selecting an event which is predicted to cause a biometric response of the user which will achieve the biometric target. The biometric response profile may also be used to generate a future event in order to cause the user to experience a particular biometric response in a real-world scenario. For example, when a user is exercising, they may wish to increase their adrenaline levels to prepare their body for physical activity, and therefore may set a biometric target with high biometric responses. A future event may then be generated which is predicted to cause the user to experience a high biometric response, such as a particular video, particular music, or particular sounds. For example, a particular song which has previously caused the user to experience an increase in biometric response may be played to the user, e.g. via headphones. In another example, a user may wish to experience a high biometric response (e.g., a high stress response), for example, to customize themselves to experiencing a certain stress level while performing a real world activity. For example, prior to an examination, such as a music examination, the user may wish to experience stressful conditions while practicing for the music exam in order to prepare themselves for the stress of the actual examination. Thus, the user may select a high biometric response as the target biometric response, and a future event may be generated which is predicted to cause a corresponding biometric response. Alternatively, the user may wish to reduce their stress levels which may have been raised due to the proximity of the examination, and may therefore select low biometric response as the target biometric response, or indicate that they wish to have their biometric responses lowered, where a future event may be generated which is predicted to lower the biometric response of the user. In a similar example, where a user is practicing for public speaking, and wishes to experience stressful conditions while practicing to prepare themselves for a real speech, they may select a high biometric response as the target biometric response, and a future event may be generated which is predicted to cause a corresponding biometric response.

In an example, based on the biometric response profile, a predicted response of the user to future video content is determined. For example, the biometric response profile may be used to determine the user's likely response to future content, for example, based on events comprised in the video content, such as a TV series, a film, or an advertisement. For example, for an advertisement, it may be determined whether the user will likely have a strong biometric response to the video content, or a low biometric response. In a further example, video content such as an advertisement may be tailored to a user by selecting for incorporation into the video content a future event which is predicted to cause a particular reaction of the user (e.g. a biometric response corresponding to excitement). Similarly, an event in the video content may be exchanged for an alternative future event, where it is determined that the user's response to the video content will be undesirable (e.g., where the user's likely biometric response indicates a dislike of the event).

Figure 9:
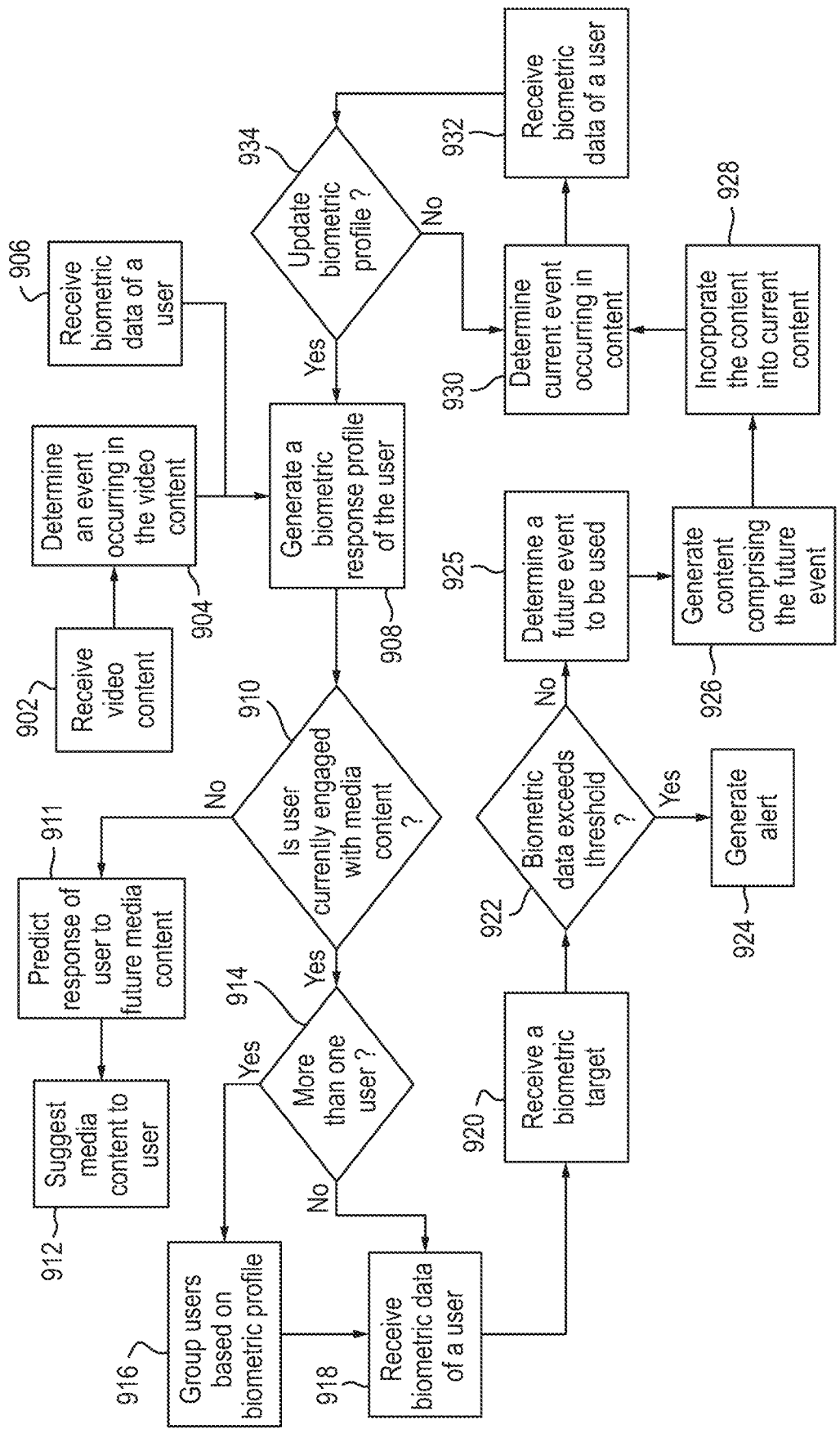
FIG. 9 is a flowchart representing a process for using a biometric response profile of a user, in accordance with some examples of the disclosure.

FIG. 9 illustrates a flow diagram representing a process for generating a biometric response profile 101 and using the biometric response profile 101 according to an example. While the example shown in FIG. 9 refers to the use of system 100, as shown in FIG. 1, it will be appreciated that the illustrative process shown in FIG. 9, may be implemented, in whole or in part, on system 100 and system 200, either alone or in combination with each other, and/or any other appropriately configured system architecture.

At 902, control circuitry, e.g., control circuitry of the user device 103, receives video content.

At 904, control circuitry, e.g., control circuitry of the server 104, determines an event occurring in the video content.

At 906, control circuitry, e.g., control circuitry of the server 104, receives biometric data 112 of a user 102, for example, the biometric data 112 of the user 102 viewing the video content. The biometric data 112 may comprise a biometric response 112 of the user 102 to the event.

At 908, control circuitry, e.g., control circuitry of the server 104, generates a biometric response profile 101 of the user 102. For example, a biometric response profile 101 may be generated based on the biometric data 112 and the event, where the biometric response profile 101 indicates a predicted biometric response of the user 102 to a future event 116 corresponding to the event.

At 910, control circuitry, e.g., control circuitry of the server 104, determines whether a user 102 is currently engaged with media content. For example, the user 102 may be currently interacting with an interactive digital experience, or media content such as a film or TV.

Where the user 102 is not currently engaged with media content (NO at 910), at 911, control circuitry, e.g., control circuitry of the server 104, predicts a response of the user 102 to future media content. For example, a prediction may be made using the biometric response profile 101 of the user 102 as to the likely reaction of the user 102 to future media content.

912, control circuitry, e.g., control circuitry of the server 104, outputs a suggestion of media content to a user device 103, for example, based on the biometric response profile 101 of the user 102, and in some examples, based on a biometric response profile 101 of the user 102 and a target biometric response, in addition to the current biometric data 112 of the user 102, which may be received prior to step 910 in some examples. For example, the user device 103 may provide to a user 102 the suggestion of media content. In an example, the biometric response profile 101 of the user 102 may be used to determine media content (e.g., video content), that may appeal to the user 102.

Where the user 102 is currently engaged with media content (YES at 910), at 914, control circuitry, e.g., control circuitry of the server 104, determines whether there is more than one user 102 (e.g. of the media content). For example, the media content may be a multiplayer game with a plurality of users. In another example, the media content may be video content, where a plurality of users are watching the same video content.

Where there is more than one user 102 (YES at 914), at 916, control circuitry, e.g., control circuitry of the server 104, groups users based on the biometric response profile 101. For example, users with a similar biometric response profile 101 may be grouped into the same group. Where users belong to the same group, future alterations to the content of the media content made for the user 102 may also be made for other users belonging to the same group.

Then, at 918, control circuitry, e.g., control circuitry of the server 104, receives biometric data 112 of the user 102. For example, biometric data 112 of the user 102 while the user 102 is interacting with the media content may be received. The biometric data 112 of the user 102 may be biometric data 112 of a user 102 while the user 102 interacts with media content, such as an interactive digital experience.

Where there is not more than one user 102 (NO at 914), the process moves to 918.

At 920, control circuitry, e.g., control circuitry of the server 104, receives a biometric target. The biometric target may be a user 102 set biometric target. The biometric target may be set based on a control configuration, wherein the control configuration indicates a maximum biometric response of a user 102.

At 922, control circuitry, e.g., control circuitry of the server 104, determines whether the biometric data 112 of the user 102 exceeds a threshold, e.g., a threshold set by the biometric target.

Where it is determined that the biometric data 112 exceeds the threshold (YES at 922), at 924, control circuitry, e.g., control circuitry of the server 104, generates an alert. For example, an alert may be generated and forwarded to a user device 103, such as a user device 103 of a parent or guardian where the threshold is a control configured threshold.

Where it is determined that the biometric data 112 does not exceed the threshold (NO at 922), at 925, control circuitry, e.g., control circuitry of the server 104, determines a future event 116 to be used. For example, the future event 116 may be determined based on the biometric target, the biometric response profile 101 of the user 102, and the current biometric data 112 of the user 102, where determining that that future event 116 to be used is an event which is predicted to cause an increase or reduction in biometric response of the user 102 to achieve the biometric target. Thus, the biometric response profile 101 may be used to predict a biometric response of a user 102 to the future event 116.

At 926, control circuitry, e.g., control circuitry of the server 104, generates content comprising the future event 116. For example, the future event 116 may be generated to be integrated with the media content.

At 928, control circuitry, e.g., control circuitry of the server 104, incorporates the content comprising the future event 116 into current content. For example, where the media content is an interactive digital experience, such as a game, the new content may be incorporated into the current content of the game.

At 930, control circuitry, e.g., control circuitry of the server 104, determines a current event occurring in the content. For example, the current content of the media content may be analyzed to determine events occurring in the media content.

At 932, control circuitry, e.g., control circuitry of the server 104, receives biometric data 112 of the user 102. For example, the received biometric data 112 of the user 102 may be biometric data 112 of the user 102 during an interaction of the user 102 with the content of an interactive digital experience, while an event is occurring in the content.

At 934, control circuitry, e.g., control circuitry of the server 104, determines whether the biometric response profile 101 is to be updated. For example, where an event occurs in the content, and the biometric data 112 of the user 102 indicates that the user 102 has a strong reaction to the event, the biometric response profile 101 may be updated to indicate a future event 116 corresponding to the event, and a predicted response of the user 102 to the future event 116. Where the user 102 has a strong reaction to the event, it may be determined that the biometric response profile 101 is to be updated (YES at 934), and the process may move back to 908.

Where it is determined that the biometric response profile 101 is not to be updated (e.g., NO at 934), the process moves back to 930.

The actions or descriptions of FIG. 9 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining, using control circuitry, an event occurring in video content;
   receiving, using control circuitry, biometric data of a user viewing the video content, the biometric data comprising a biometric response of the user to the event;
   generating, using control circuitry, based on the biometric data and the event, a biometric response profile of the user indicating a predicted biometric response of the user to a future event corresponding to the event;
   receiving an indication of a maximum biometric response that is desired for the user, wherein the indication is based on receiving input, via a client device of the user, selecting the maximum biometric response;
   comparing the predicted biometric response of the user to the maximum biometric response;
   based at least in part on the comparing, determining that the maximum biometric response exceeds the predicted biometric response;
   based at least in part on determining that the maximum biometric response exceeds the predicted biometric response, modifying at least one attribute of the future event in a manner that is predicted to result in a biometric response of the user to the modified future event that exceeds the predicted biometric response to the future event; and
   generating for display the modified future event.

2. The method of claim 1, wherein the method further comprises:
   determining that current biometric data of the user exceeds the maximum biometric response; and
   generating an alert based on determining that the current biometric data of the user exceeds the maximum biometric response.

3. The method of claim 1, further comprising receiving further biometric data of the user during interaction of the user with the modified future event, and wherein the biometric response profile of the user is updated based on the further biometric data.

4. The method of claim 1, the method further comprising grouping a plurality of users based on a biometric response profile generated for each user, wherein users having similar predicted biometric responses to the future event are grouped in the same group.

5. The method of claim 1, wherein the method further comprises outputting a suggestion of media content to the client device of the user based on the biometric response profile of the user.

6. The method of claim 1, wherein the method further comprises outputting a suggestion of media content to the client device of the user based on current biometric data of the user, the biometric response profile of the user, and the maximum biometric response.

7. The method of claim 1, wherein the method further comprises determining, based on the biometric response profile, a predicted biometric response of the user to further video content.

8. The method of claim 1, wherein modifying the at least one attribute of the future event further comprises modifying an advertisement.

9. The method of claim 1, wherein the biometric data is based at least in part on sensor data indicative of a stress level of the user.

10. The method of claim 1, wherein modifying the at least one attribute of the future event further comprises modifying an appearance of an object in the video content.

11. A system comprising:
control circuitry configured to:
- determine an event occurring in video content;
- receive biometric data of a user viewing the video content, the biometric data comprising a biometric response of the user to the event;
- generate, based on the biometric data and the event, a biometric response profile of the user indicating a predicted biometric response of the user to a future event corresponding to the event;
- receive an indication of a maximum biometric response that is desired for the user, wherein the indication is based on receiving input, via a client device of the user, selecting the maximum biometric response;
- compare the predicted biometric response of the user to the maximum biometric response;
- based at least in part on the comparing, determine that the maximum biometric response exceeds the predicted biometric response;
- based at least in part on determining that the maximum biometric response exceeds the predicted biometric response, modify at least one attribute of the future event in a manner that is predicted to result in a biometric response of the user to the modified future event that exceeds the predicted biometric response to the future event; and
- generate for display the modified future event.

12. The system of claim 11, wherein the control circuitry is further configured to:
- determine that current biometric data of the user exceeds the maximum biometric response; and
- generate an alert based on determining that the current biometric data of the user exceeds the maximum biometric response.

13. The system of claim 11, the control circuitry being further configured to receive further biometric data of the user during interaction of the user with the modified future event, and wherein the biometric response profile of the user is updated based on the further biometric data.

14. The system of claim 11, the control circuitry being further configured to group a plurality of users based on a biometric response profile generated for each user, wherein users having similar predicted biometric responses to the future event are grouped in the same group.

15. The system of claim 11, wherein the control circuitry is further configured to output a suggestion of media content to the client device of the user based on the biometric response profile of the user.

16. The system of claim 11, wherein the control circuitry is further configured to output a suggestion of media content to the client device of the user based on current biometric data of the user, the biometric response profile of the user, and the maximum biometric response.

17. The system of claim 11, wherein the control circuitry is further configured to determine, based on the biometric response profile, a predicted biometric response of the user to further video content.

18. The system of claim 11, wherein the control circuitry is further configured to modify the at least one attribute of the future event further by modifying an advertisement.

19. The system of claim 11, wherein the biometric data is based at least in part on sensor data indicative of a stress level of the user.

20. The system of claim 11, the control circuitry is further configured to modify the at least one attribute of the future event further comprises modifying an appearance of an object in the video content.

* * * * *